(12) United States Patent
Contreras et al.

(10) Patent No.: US 8,891,189 B1
(45) Date of Patent: Nov. 18, 2014

(54) DISK DRIVE WITH FILTER COMPENSATION INTEGRATED IN SLIDERS FOR HIGH-BANDWIDTH READ SENSORS

(71) Applicant: HGST Netherlands B.V., Amsterdam (NL)

(72) Inventors: John Contreras, Palo Alto, CA (US); Samir Y. Garzon, Sunnyvale, CA (US); Bruce Alvin Gurney, San Jose, CA (US); David John Seagle, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/218,591

(22) Filed: Mar. 18, 2014

(51) Int. Cl.
G11B 5/09 (2006.01)

(52) U.S. Cl.
USPC .................................. 360/46; 360/55; 360/67

(58) Field of Classification Search
None
See application file for complete search history.

(56) References Cited

U.S. PATENT DOCUMENTS

| | | | |
|---|---|---|---|
| 5,166,837 A * | 11/1992 | Nakamura | 360/46 |
| 5,608,591 A | 3/1997 | Klaassen | |
| 5,717,547 A | 2/1998 | Young | |
| 6,275,358 B1 | 8/2001 | Balakrishnan et al. | |
| 6,331,919 B1 | 12/2001 | Klaassen et al. | |
| 6,349,009 B1 | 2/2002 | Dakroub et al. | |
| 6,567,228 B1 * | 5/2003 | Bhandari et al. | 360/67 |
| 6,603,623 B1 | 8/2003 | Fontana et al. | |
| 6,708,243 B1 | 3/2004 | Leddige et al. | |
| 6,791,429 B2 | 9/2004 | Mikalauskas | |
| 6,847,501 B2 * | 1/2005 | Cheung et al. | 360/46 |
| 7,545,608 B2 | 6/2009 | Araki et al. | |
| 2003/0043508 A1 | 3/2003 | Schulz et al. | |
| 2006/0044695 A1 | 3/2006 | Erpelding | |
| 2013/0135765 A1 | 5/2013 | Contreras et al. | |

FOREIGN PATENT DOCUMENTS

| | | |
|---|---|---|
| JP | 6077711 A | 3/1994 |
| JP | 2002084157 A | 3/2002 |
| JP | 2008028464 A | 2/2008 |
| JP | 2010135602 A | 6/2010 |

OTHER PUBLICATIONS

Robert Kost, et al.; Arbitrary Equalization with Simple LC Structures; IEEE Trans. Magnetics, vol. MAG-17, No. 6, Nov. 1981, pp. 3346-3348.

* cited by examiner

Primary Examiner — Muhammad N Edun
(74) Attorney, Agent, or Firm — G. Marlin Knight

(57) ABSTRACT

Disk drives with sliders including with an impedance compensation network in the signal path for the read sensor are described. The read signal bandwidth at the preamplifier is improved by the impedance compensation network to allow signals in the multi-GHz range from spin torque oscillators as well as tunnel magnetoresistance (TMR) sensors to be used. An embodiment of the invention achieves a signal layout balance by constructing two inductor-capacitor pair structures on the trailing edge of the slider that are integrated into the differential read signal traces. The differential balanced structure helps to suppress external signal interference pickup from transferring from common-mode pick-up to differential mode.

19 Claims, 3 Drawing Sheets

Compensation Network for Read Sensor

DISK DRIVE WITH FILTER COMPENSATION INTEGRATED IN SLIDERS FOR HIGH-BANDWIDTH READ SENSORS

FIELD OF THE INVENTION

Embodiments of the invention relate generally to thin film sensors (heads) used in magnetic data storage systems with rotating disks, and more particularly to design and fabrication of sliders that include thin film read and write heads, which are used in such systems.

BACKGROUND

A prior art disk drive 10, see FIG. 1, typically includes a main integrated circuit, which is typically called a system on a chip (SOC) 11 that contains many of the electronics and firmware for the drive. Each disk (not shown) can have thin film magnetic material on each of the planar surfaces. Each disk surface normally has a dedicated pair of read and write heads packaged in a slider 13 that also includes fly-height control components. The sliders are mechanically mounted on an actuator (not shown) with various flexible components to allow appropriate degrees of movement during operation. Each slider is a sub-component of a head gimbal assembly (HGA) that typically includes a suspension assembly with a laminated flexure with copper traces to carry the electrical signals to and from the heads.

The sliders are selectively positioned over tracks on the rotating disk by the actuator (not shown). The actuators also provide the electrical connections to the slider components and contain the arm electronics (AE) chip 12 which typically include differential preamplifiers (preamps) 18 for the read heads, write drivers and fly-height controls. Unless otherwise noted, the term actuator will be used herein to include all of the mechanical and electrical components that are required for the sliders to function. A flex cable (not shown) connects the SOC 11 to the AE 12. The AE typically include digital and analog circuitry that control the signals sent to components in the slider and processes the signals received from the slider components. The write driver generates an analog signal that is applied to the inductive coil in the write head to write data by selectively magnetizing portions of the magnetic material on the surface of the rotating disk. Impedance compensation features can be used along the transmission-line path connected to the sensors to compensate for the impedance discontinuities or mismatches (for example, those caused by physical interconnection features) and/or to improve the frequency response of the signal transfer along the transmission line.

The read and write heads (sensors) heads and associated connections are conventionally formed using thin film lithographic patterning in which a series of thin films deposited and patterned on the trailing surface slider. The slider body is typically made of alumina-titanium carbide material. The write head includes an inductive coil. The read head 15 typically includes a magnetoresistive (MR) sensor (read element) located between two magnetic shields. Various subtypes of MR sensors are known including tunnel magnetoresistance (TMR) devices and spin-torque oscillator (STO) devices. In STOs the spin-torque effect generates oscillating magnetization (precession). External magnetic fields can change the oscillation frequency in STOs, so these sensors can be used to read magnetic information recorded in the thin films on the disks.

Reading data at high-data rates from the rotating disks requires a high-bandwidth transmission path. The spin-torque oscillator (STO) requires a very high bandwidth (>3 GHz) to allow for a high-frequency data-modulated carrier frequency. However, the intrinsic read sensor construction creates a significant amount of parasitic capacitance, which limits the bandwidth. The read signal transfer requires a means to mitigate the parasitic capacitance to allow high-frequency signal transfer. Circuit structures that can be fabricated on the slider adjacent to the read sensors are needed to mitigate the parasitic capacitance impact and allow for high-bandwidth signal transfer from the read sensors.

U.S. Pat. No. 6,603,623 to Fontana, et al. (Aug. 5, 2003) describes an inductive magnetic recording (write) head with impedance matching elements including a resistor and capacitor network on the trailing surface of a slider that change the termination impedance of the write head so that it matches the characteristic impedance of the transmission line that supplies the write current.

U.S. Pat. No. 7,545,608 to Araki, et al. (Jun. 9, 2009) uses resistors and capacitors on the trailing surface of a slider to substantially equalize the total parasitic capacitance on the S2 shield with the total parasitic capacitance on the 51 shield, to reduce interference pickup in the high frequency region.

In published U.S. patent application 2013/0135765 (pub. May 30, 2013) Contreras, et al. ladder network compensation circuitry is located on the slider body for increasing the overshoot of the write current at the time of current switching. The ladder network compensation circuitry includes capacitors and inductors fabricated on the slider body, for example, on the trailing surface of the slider adjacent to the write head. Embodiments of discrete capacitors and inductors are described that can be fabricated on the trailing surface of a slider. The inductors include an upper coil section on one side and a lower coil section on the opposite side that are electrically connected by vias.

SUMMARY OF THE INVENTION

Embodiments of the invention integrate passive electrical components formed on the slider, which can include inductive (L), resistive (R) and capacitive (C) elements, into the signal path for the read element/sensor to improve the electrical read signal's path by compensating for the inherent parasitics of the read sensor's structure. The invention can be used with STO sensors, as well as, TMR sensors including future generations with data rates well above 3 GHz.

Embodiments of the invention with STO read sensors have significantly improved electrical interconnect bandwidth by integrating an RF filter into the slider design. This integrated RF filter provides electrical impedance matching for the transmission line (TL) connecting the read sensor signal to the read preamplifier. The building block components for this compensation: series, shunt (parallel), and combination of the series and parallel components, which creates a ladder network in the signal path in the slider before connecting to the TL. In addition, the read sensor has inherent parasitic capacitance, which can be mitigated by the RF filter. Embodiments of the invention use the impedance presented by the gimbal interconnection to the slider and the impedance of the read sensor to calculate approximate values for the compensation components.

An embodiment of the invention is described achieves a signal layout balance by constructing two inductor-capacitor pair structures on the trailing edge of the slider that are integrated into the differential read signal traces. The differential balanced structure helps to suppress external signal interference pick-up from transferring from common-mode pick-up to differential mode. The inductance is balanced by having a symmetric layout on each of the differential leads. The balanced structure for the capacitance is created by two similarly constructed parallel capacitors, where each capacitor is constructed of two plates. Each lead of the differential path connects to one of capacitors plates in each capacitor. The other plate of each capacitor then connects to the opposite polarity lead, to create a balanced parallel connection of the two capacitors.

DETAILED DESCRIPTION OF THE INVENTION

Figure 1:
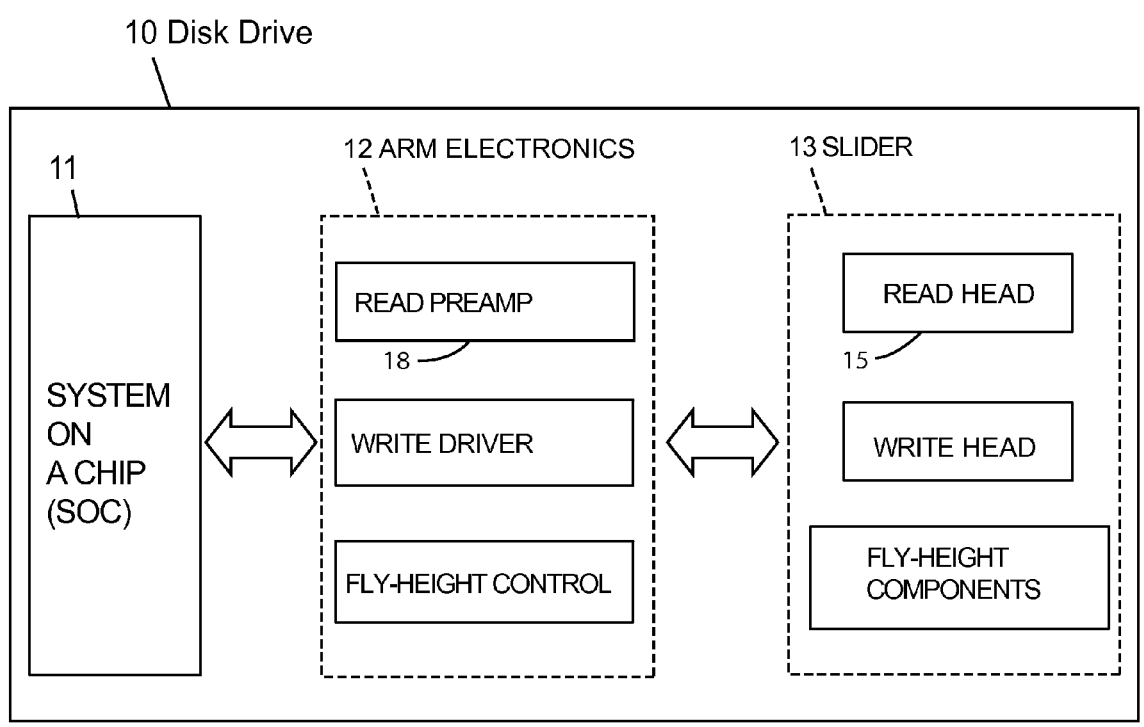
FIG. 1 is a block illustration of selected components of a prior art disk drive.
Figure 2:
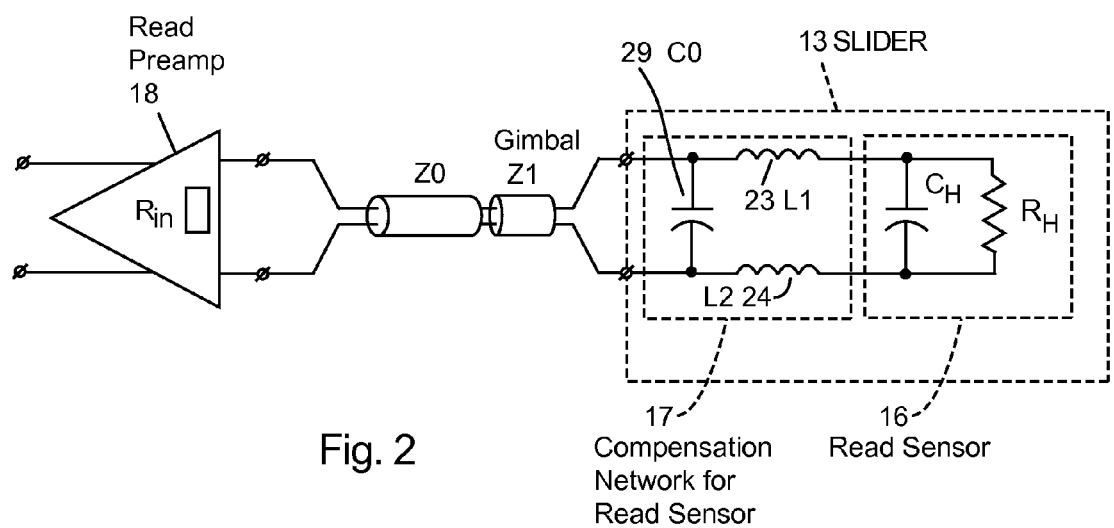
FIG. 2 is a block illustration of selected components of a disk drive with a slider with compensation components in the read sensor circuit according to an embodiment of the invention.

FIG. 2 is a block illustration of selected components of a disk drive with a slider with compensation components according to an embodiment of the invention. The compensation network circuit 17 is placed in the signal path for the read sensor 16 in slider 13. The impedance of the read sensor 16 is modeled as the parallel combination of capacitor $C_H$ and resistor $R_H$. The transmission line between the slider and the read preamp 18 is modeled as the series combination of Z1, which is the gimbal component, and Z0, which the effective impedance of all of the other components in the path. It is the gimbal Z1 impedance presented to the read head slider that is most significant for selecting the compensation network that is placed in the slider.

The embodiment shown in FIG. 2 combines the series compensation (SC) and parallel compensation (PC) for the read sensor 16, thereby creating a ladder network compensation (LNC). Capacitor C0 29 is placed in parallel and the two inductors L1 23, L2 24 are in series in the respective leads of the signal path. The two inductors L1, L2 in this embodiment are selected to have one half of the total inductance L needed for the circuit.

For the read-head source compensation, the integrated LNC may use the transmission line (TL) equation to determine the inductance (L) and capacitance (C) values. Equation 1 provides a guide for calculating the values of L and C:

$$Z1 = \text{sqrt}(L/C_H) \quad \text{(Equation 1)}$$

Where:
$C_H$ is the effective parasitic capacitance of the STO read element.
Z1 is in the effective impedance presented by the gimbal interconnection.
The $C_H$ value is intrinsic to the structure of the read sensor, which can be adjusted for the desired frequency response, so the L value can be determined by Equation 1. The same equation, using the L value, can be applied to determine the C0 value.

Figure 3:
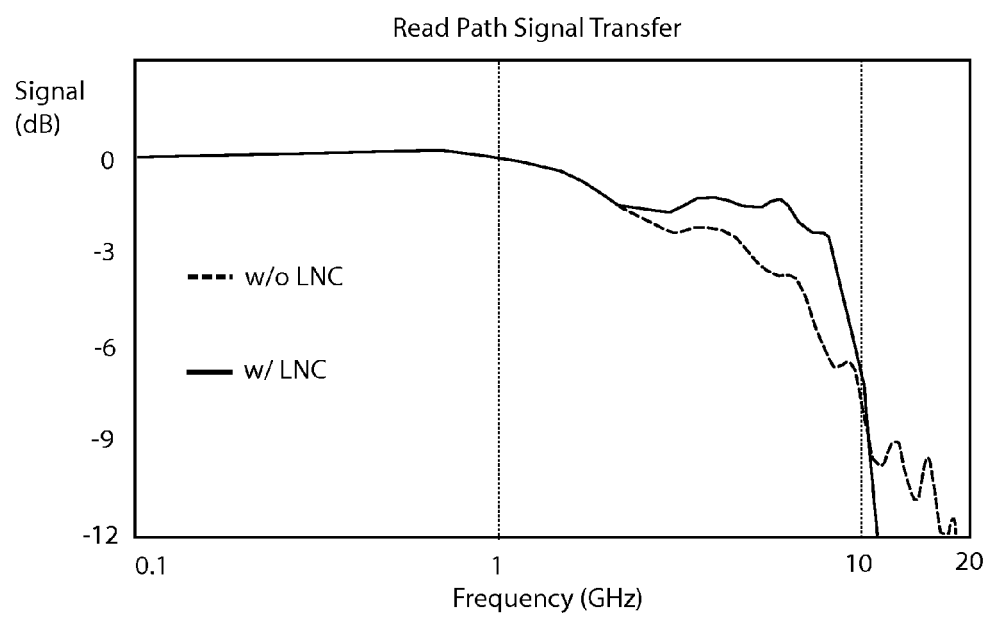
FIG. 3 is a graph illustrating the read signal response with compensation components according to an embodiment of the invention.

FIG. 3 is a graph illustrating the read signal response with and without compensation components according to an embodiment of the invention with an STO read sensor. With an LNC network, the bandwidth is increased by more than 60%. The effect of the compensation network is to extend the usable signal frequency up to about 6 GHz. This technique can be applied not only to STO sensors but also to future generations of TMR sensors which operate at data rates well above 3 GHz.

Only relatively small values of inductance and capacitance are needed for the improved bandwidth in the 6 GHz range. Passive components required to implement embodiments of the invention can be manufactured cost effectively using the same materials and lithographic processes that are used to create other transducers in the slider (read, write, and thermal). These new integrated RF filtering/compensation components will require few additional masks and add relatively little additional cost to the slider fabrication. For the RF filter, capacitors ranging from a few fF to 10's of pF can be fabricated from alumina gaps ranging from 10 nM to several hundred nano-meters. Inductors up to 10's of nH can be made from shield and pole materials (nickel and iron) already required for the write and read transducers.

Spiral inductors for use in embodiments of the invention can be created on the trailing surface of the slider using techniques described in the prior art. See for example, published U.S. patent application 2013/0135765 (pub. May 30, 2013) Contreras, et al.

Figure 4:
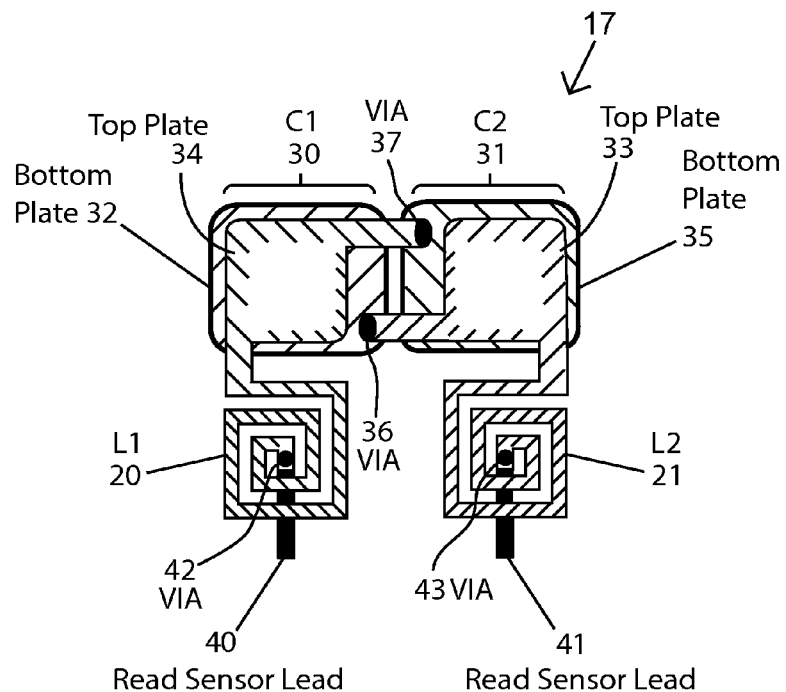
FIG. 4 is an illustration of the structure of capacitor and inductor pairs that can be used as compensation components in the read sensor circuit in an embodiment of the invention.
Figure 5:
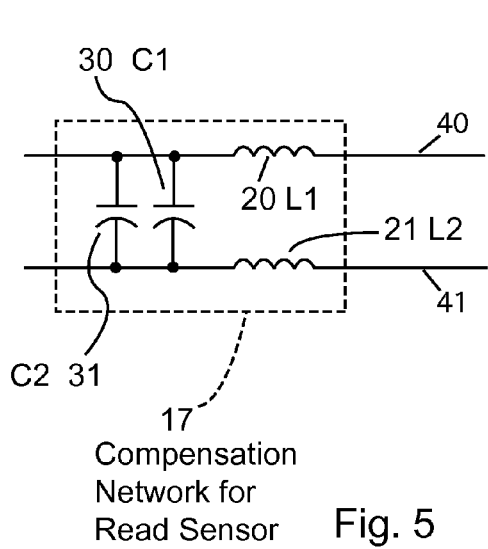
FIG. 5 is a circuit diagram illustrating the compensation components shown in FIG. 4 according to an embodiment of the invention.
Figure 6:
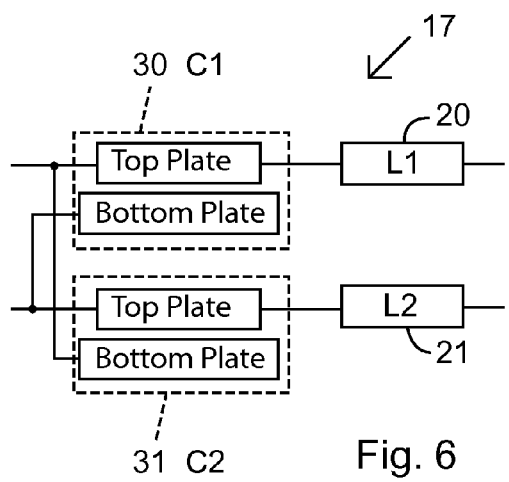
FIG. 6 is a block diagram illustrating the electrical connections between the compensation components shown in FIG. 4 according to an embodiment of the invention.

FIG. 4 is an illustration of a top view of the structure of capacitor and inductor pairs that can be used as compensation components 17 in the read sensor circuit in an embodiment of the invention. The structures that form the inductors and capacitors can be created on the trailing surface of the slider using multiple thin film layers and standard pattering techniques. The insulating materials that encase the structures are not shown so that underlying structures can be illustrated. The top and bottom capacitor plates are formed from electrically conductive material, which is separated by a dielectric layer which is not shown. FIG. 5 is a circuit diagram illustrating the compensation components shown in FIG. 4. FIG. 6 is a block diagram illustrating the electrical connections between the physical compensation components shown in FIG. 4.

For signal layout balance, the inductor-capacitor pair structure in this embodiment is applied to the differential read signal traces. The differential balanced structure helps to suppress external signal interference pick-up from transferring from common-mode pick-up to differential mode. The inductance is balanced by having a symmetric layout on each of the differential leads. The effective capacitance balance is created by two similarly constructed parallel capacitors, where each capacitor is constructed from two parallel plates separated by an appropriate dielectric layer. The differential signal path has an effective positive and negative lead. Each lead of the differential path connects to one plate in each capacitor. The other plate of each capacitor then connects to the opposite polarity lead, to create a balanced parallel connection of the two capacitors.

The inductor in each pair is in series connection in the legs of the signal path as shown in FIGS. 5 and 6. The effective capacitance is connected across the legs of the signal path in a shunt arrangement using a crossover configuration. The read sensor attachment leads 40, 41 are formed on a layer below the inductors and are separated from the spiral loops of the inductors 20, 21 by a layer of insulation except through the via structures 42 and 43 that extend between the multiple layers. The vias are filled with electrically conductive material, which connects the signal path to the starting points of the inductor spirals. The other end of the inductor spirals then electrically connect to the top plates 34, 33 of the two capacitors C1 30 and C2 31. The top plates of the capacitors and the inductors can be formed simultaneously on a single layer. The bottom plates of the capacitors are formed on a previous lower layer and have a dielectric layer deposited over them to separate them from the top plates. Although not required for functionality, the bottom plates in FIG. 4 are slightly larger in area than the top plates, which provides convenient areas for the vias 36, 37 to extend down to connect to the bottom plates without having to penetrate through an overlaying top layer.

From the top plates the electrical path in each signal leg then crosses over to connect to the capacitor's bottom plate on the other side of the structure. Thus, the C1 top plate 34 is electrically connected to the top of via 37, which extends down through the insulating layer(s) to connect to C2 bottom plate 35. This arrangement is illustrated in FIG. 6 which includes the electrical path from left side of the C1 top plate 34 to the C2 bottom plate 35. Similarly, the C2 top plate 33 is electrically connected to the top of via 36, which extends down through the set of layers to connect to C1 bottom plate 32. As shown in FIG. 6, the two signal paths on the left are each connected to one of the capacitors' top plates and are the exit path of the slider's connection to the suspension's electrical interconnect as shown in FIG. 2.

The invention claimed is:

1. A disk drive that stores information in magnetic material on rotating disks, comprising:
   a preamplifier for processing a filtered signal derived from a read sensor positioned over the rotating disk;
   a signal transmission line connected to the preamplifier to supply the filtered signal to the preamplifier; and
   a slider that supplies the filtered signal to signal transmission line, the slider including the read sensor and an impedance compensation network formed from thin film structures that have selected capacitance and inductance, the impedance compensation network being connected to the signal transmission line and the read sensor, the impedance compensation network filtering an output of the read sensor to generate the filtered signal.

2. The disk drive of claim 1, wherein the read sensor is a spin-torque oscillator.

3. The disk drive of claim 1, wherein the impedance compensation network matches an input impedance of the signal transmission line.

4. The disk drive of claim 1, wherein the impedance compensation network includes thin film structures fabricated on a trailing edge of the slider forming a ladder network.

5. The disk drive of claim 1, wherein the preamplifier is a differential preamplifier which is connected to first and second legs of signal transmission line which are connected to first and second legs of the impedance compensation network, which has corresponding first and second signal paths, and wherein the first signal path in the impedance compensation network includes the first inductor connected in series and the second signal path in the impedance compensation network includes the second inductor connected in series and wherein thin film capacitive structures create an effective capacitance connected across the first and second signal paths.

6. The disk drive of claim 5, wherein the thin film capacitive structures further comprise first and second top plates and first and second bottom plates arranged with the first top plate and first bottom plate being separated by dielectric material to form a first capacitor, and with the second top plate and second bottom plate being separated by dielectric material to form a second capacitor and wherein the first inductor is electrically connected to the first top plate and the second inductor is electrically connected to the second top plate and the first top plate is electrically connected to the second bottom plate and the second top plate is electrically connected to the first bottom plate and wherein the first and second top plates are respectively electrically connected to first and second legs of signal transmission line.

7. The disk drive of claim 6, wherein first and second top plates and first and second inductors are formed together on a selected layer and first and second vias filled with conductive material provide electrical connections from the first top plate to the second bottom plate and from the second top plate to the first bottom plate.

8. The disk drive of claim 7, wherein first and second vias are positioned where areas of the first and second bottom plates extend beyond edges of the first and second top plates.

9. The disk drive of claim 1, wherein the filtered signal has broad-band frequency.

10. The disk drive of claim 1, wherein a frequency of the filtered signal is greater than 3 GHz.

11. The disk drive of claim 1, wherein the read sensor is a tunnel magnetoresistance (TMR) device.

12. The disk drive of claim 11, wherein the impedance compensation network matches an input impedance of the signal transmission line.

13. The disk drive of claim 11, wherein the impedance compensation network includes thin film structures fabricated on a trailing edge of the slider forming a ladder network.

14. The disk drive of claim 11, wherein the preamplifier is a differential preamplifier which is connected to first and second legs of signal transmission line which are connected to first and second legs of the impedance compensation network, which has corresponding first and second signal paths, and wherein the first signal path in the impedance compensation network includes the first inductor connected in series and the second signal path in the impedance compensation network includes the second inductor connected in series and wherein thin film capacitive structures create an effective capacitance connected across the first and second signal paths.

15. The disk drive of claim 14, wherein the thin film capacitive structures further comprise first and second top plates and first and second bottom plates arranged with the first top plate and first bottom plate being separated by dielectric material to form a first capacitor, and with the second top plate and second bottom plate being separated by dielectric material to form a second capacitor and wherein the first inductor is electrically connected to the first top plate and the second inductor is electrically connected to the second top plate and the first top plate is electrically connected to the second bottom plate and the second top plate is electrically connected to the first bottom plate and wherein the first and second top plates are respectively electrically connected to first and second legs of signal transmission line.

16. The disk drive of claim 15, wherein first and second top plates and first and second inductors are formed together on a selected layer and first and second vias filled with conductive material provide electrical connections from the first top plate to the second bottom plate and from the second top plate to the first bottom plate.

17. The disk drive of claim 16, wherein first and second vias are positioned where areas of the first and second bottom plates extend beyond edges of the first and second top plates.

18. The disk drive of claim 11, wherein the filtered signal has broad-band frequency.

19. The disk drive of claim 11, wherein a frequency of the filtered signal is greater than 3 GHz.

* * * * *